United States Patent
Leobandung et al.

(10) Patent No.: US 11,250,316 B2
(45) Date of Patent: Feb. 15, 2022

(54) AGGREGATE ADJUSTMENTS IN A CROSS BAR NEURAL NETWORK

(71) Applicant: International Business Machines Corporation, Armonk, NY (US)

(72) Inventors: Effendi Leobandung, Stormville, NY (US); Zhibin Ren, Hopewell Junction, NY (US); Seyoung Kim, Korea (KR); Paul Michael Solomon, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 16/100,673

(22) Filed: Aug. 10, 2018

(65) Prior Publication Data

US 2020/0050929 A1    Feb. 13, 2020

(51) Int. Cl.
  *G06N 3/063* (2006.01)
  *G06N 3/04* (2006.01)
(52) U.S. Cl.
  CPC ......... *G06N 3/0635* (2013.01); *G06N 3/0472* (2013.01)
(58) Field of Classification Search
  None
  See application file for complete search history.

(56) References Cited

U.S. PATENT DOCUMENTS

| | | | |
|---|---|---|---|
| 8,583,577 B2 | 11/2013 | Aparin | |
| 9,754,203 B2 | 9/2017 | Di Castro et al. | |
| 9,760,533 B2 | 9/2017 | Fick et al. | |
| 2016/0336064 A1 | 11/2016 | Seo et al. | |
| 2017/0011290 A1* | 1/2017 | Taha | G06N 3/0635 |
| 2017/0193353 A1* | 7/2017 | Lee | G06N 3/049 |
| 2017/0249989 A1* | 8/2017 | Strachan | G11C 13/004 |
| 2018/0225566 A1* | 8/2018 | Lee | G06N 3/04 |
| 2019/0251426 A1* | 8/2019 | Busch | G06N 3/0635 |
| 2019/0318242 A1* | 10/2019 | Kendall | G06N 3/082 |

FOREIGN PATENT DOCUMENTS

EP    490177 A2    6/1992

OTHER PUBLICATIONS

Chang et al., "Mitigating Asymmetric Nonlinear Weight Update Effects in Hardware Neural Network based on Analog Resistive Synapse," 8 pages.

* cited by examiner

*Primary Examiner* — Alexey Shmatov
*Assistant Examiner* — Beatriz Ramirez Bravo
(74) *Attorney, Agent, or Firm* — Patterson + Sheridan, LLP (57) ABSTRACT

Method, systems, crosspoint arrays, and systems for tuning a neural network. A crosspoint array includes: a set of conductive rows, a set of conductive columns intersecting the set of conductive rows to form a plurality of crosspoints, a circuit element coupled to each of the plurality of crosspoints configured to store a weight of the neural network, a voltage source associated with each conductive row, a first integrator attached at the end of at least one of the conductive column, and a first variable resistor attached to the integrator and the end of the at least one conductive column.

15 Claims, 8 Drawing Sheets

FIG. 1 f(x) = f (INPUT 1' CONNECTION STRENGTH 1 + INPUT 2' CONNECTION STRENGTH 2)

AGGREGATE ADJUSTMENTS IN A CROSS BAR NEURAL NETWORK

BACKGROUND

The present invention generally relates to neural networks, and more particularly one or more techniques for facilitating proper negative weight computation in neural networks.

Neural networks (NN) are a leading method for implementing machine learning and training for cognitive computing. Neural networks can be implemented in software for flexibility; however, software networks can suffer from longer lag times. Neural networks may be efficiently implemented in hardware using, e.g., cross bar implementations with variable resistance as weights. However, such processing often diverges from standard complementary metal oxide semiconductor (CMOS) processing techniques.

SUMMARY

According to one embodiment of the present disclosure, a crosspoint array is provided. The crosspoint array includes: a set of conductive rows, a set of conductive columns intersecting the set of conductive rows to form a plurality of crosspoints, a circuit element coupled to each of the plurality of crosspoints configured to store a weight of the neural network, a voltage source associated with each conductive row, a first integrator attached at the end of at least one of the conductive column, and a first variable resistor attached to the integrator and the end of the at least one conductive column.

According to another aspect of the present disclosure, a method is provided. The method includes: applying a voltage to each one of a plurality of conductive rows of a neural network, wherein the plurality of conductive rows intersect a plurality of conductive columns to form a plurality of crosspoints, and wherein a circuit element at each of the plurality of crosspoints is configured to store a weight of the neural network, and determining at least one of a reference voltage and a reference current for each of a plurality of variable resistors, wherein each of the plurality of variable resistors and each of a plurality of integrators are connected to a respective end of one of the plurality of conductive columns.

Another aspect of the present disclosure includes a computer program product for determining a parameter of a neural network circuit, the computer program product including: a computer-readable storage medium having computer-readable program code embodied therewith, the computer-readable program code executable by one or more computer processors to: apply a voltage to each one of a plurality of conductive rows of a neural network, wherein the plurality of conductive rows intersect a plurality of conductive columns to form a plurality of crosspoints, and wherein a circuit element at each of the plurality of crosspoints is configured to store a weight of the neural network, and determine at least one of a reference voltage and a reference current for each of a plurality of variable resistors, wherein each of the plurality of variable resistors and each of a plurality of integrators are connected to a respective end of one of the plurality of conductive columns.

DETAILED DESCRIPTION

It is understood in advance that although one or more embodiments are described in the context of biological neural networks with a specific emphasis on modeling brain structures and functions, implementation of the teachings recited herein are not limited to modeling a particular environment. Rather, embodiments of the present invention are capable of modeling any type of environment, including for example, weather patterns, arbitrary data collected from the internet, and the like, as long as the various inputs to the environment can be turned into a vector.

Effective neural network techniques rely on proper computation of negative and positive weights. One technique uses a duplicate array with reference resistors, but this technique suffers a severe draw back in terms of area and energy consumption. An alternative approach uses a current mirror in connection with one or more points in an array column, but this also is associated with an area penalty, and introduces noise and variability to a neural network system. One or more embodiments of the present disclosure attempt to cure these deficiencies by introducing a system and technique for using the system that conserves area, while maintaining circuit integrity and accuracy, e.g. ensuring the negative weight is properly computed from a reference value. For example, currents produced by the weights in a neural network are continuously valued and positive, and therefore reference weights are used to provide a reference current, above which currents are considered to have positive values and below which currents are considered to have negative values, and as such, the accuracy of the comparison is important to the integrity of the network In one or more embodiments, computing and assessing negative weights is achieved by using a variable resistor and integrator in the neural network system.

One type of neural network is an artificial neural network (ANN). ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale two-terminal devices, for example memristors having "ideal" conduction state switching characteristics, can be used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures can be designed to utilize offline learning techniques, where the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because during training of the ANN?? modifies a significant number of adjustable parameters (e.g., weights) in the ANN model to match the input-output pairs for the training data. Accordingly, simplifying the crosspoint devices of ANN architectures to prioritize power-saving, offline learning techniques can mean that training speed and training efficiency are not optimized.

In light of the above, providing simple crosspoint devices that keep power consumption within an acceptable range, as well as accelerate the speed and efficiency of training ANN architectures.

Although embodiments described herein are directed to electronic systems, for ease of reference and explanation various aspects of the electronic systems are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM™'s SyNapse™ computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 1:
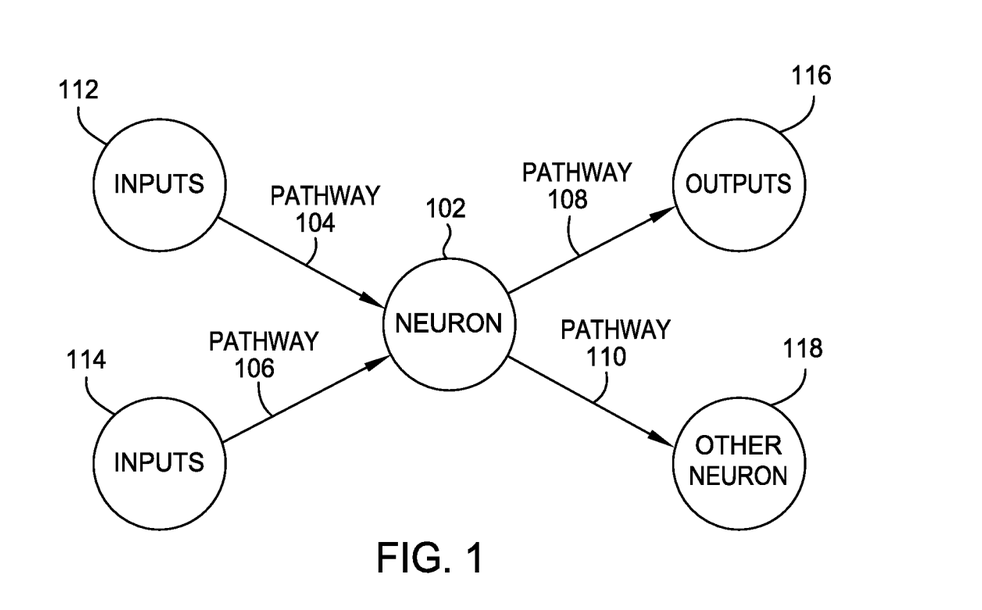
FIG. 1 depicts a simplified diagram of input and output connections of a biological neuron useful with at least one embodiment of the present disclosure.
Figure 2:
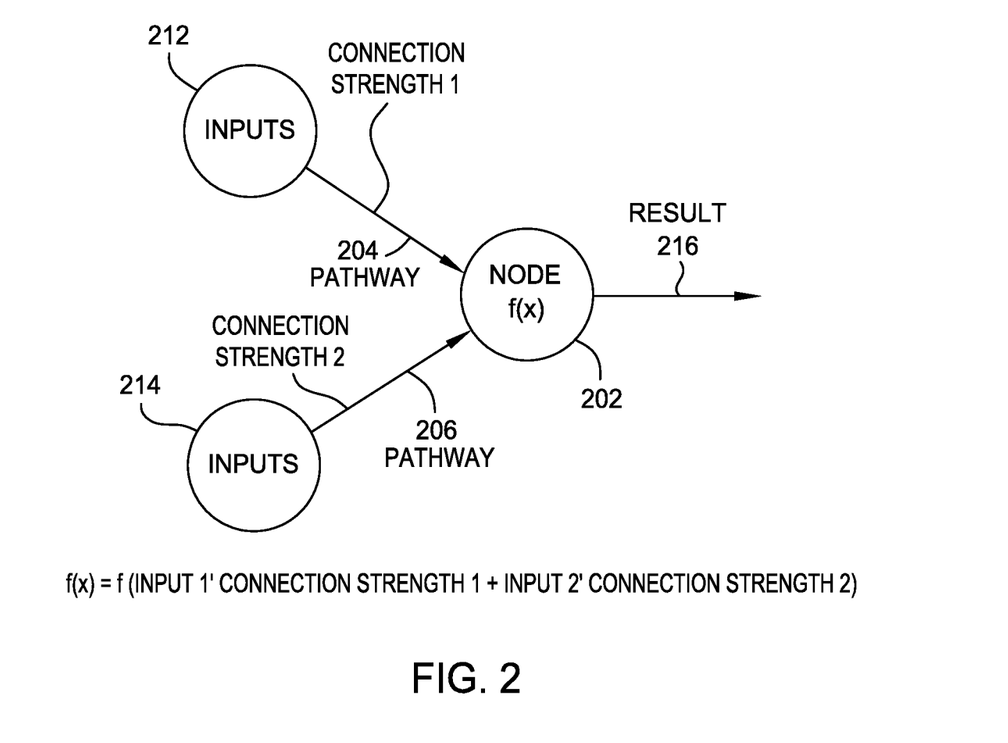
FIG. 2 depicts a known simplified model of the biological neuron shown in FIG. 1 useful with at least one embodiment of the present disclosure.
Figure 3:
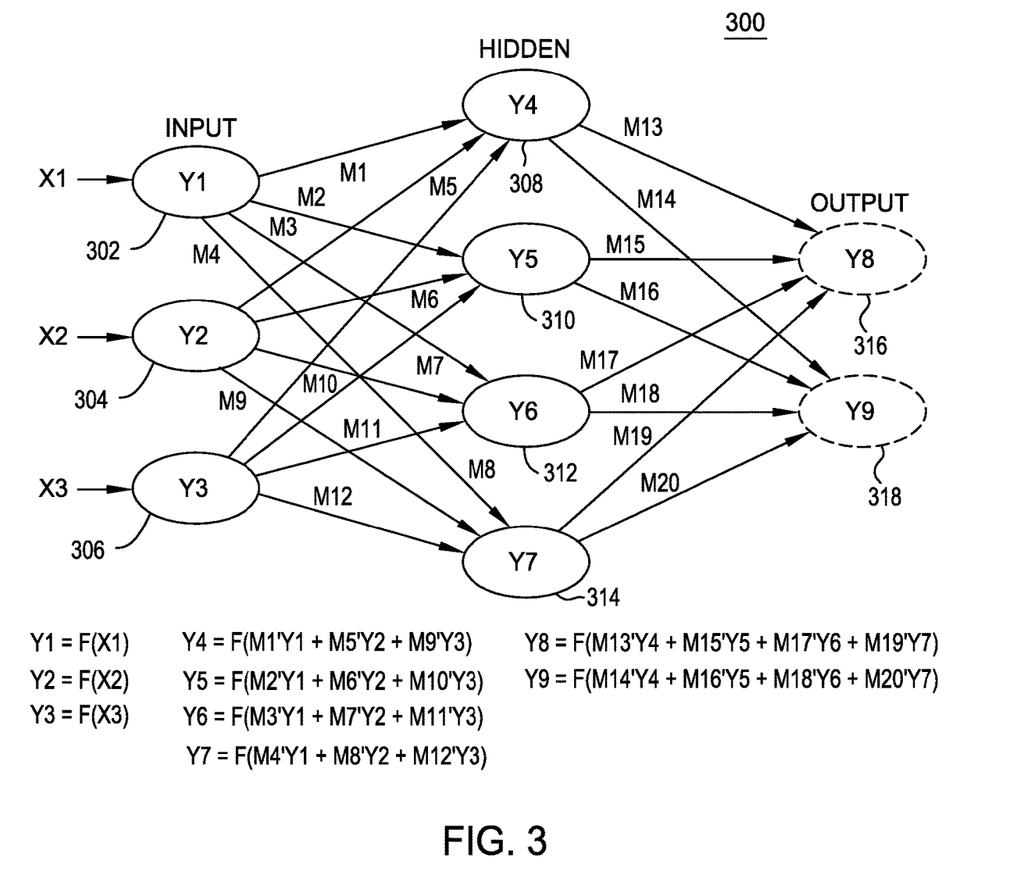
FIG. 3 depicts a known simplified model of an artificial neural network ("ANN") incorporating the biological neuron model shown in FIG. 2 useful with at least one embodiment of the present disclosure.

A general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, where the artificial neurons are nodes (e.g., 302, 308, 316), and where weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f (m1*y1+m5*y2+m9*y3), where represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network include feedback paths, which mean that the signals can travel in both directions using loops. All possible connections between nodes are allowed. Because loops are present in this type of network, under certain operations, it can become a non-linear dynamical system that changes continuously until it reaches a state of equilibrium. Feedback networks are often used in associative memories and optimization problems, where the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm can be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire description of which is incorporated by reference herein.

As previously noted herein, in order to limit power consumption, the crosspoint devices of ANN chip architectures are often designed to utilize offline learning techniques, where the approximation of the target function does not change once the initial training phase has been resolved. Offline learning allows the crosspoint devices of crossbar-type ANN architectures to be simplified such that they draw very little power.

Figure 4:
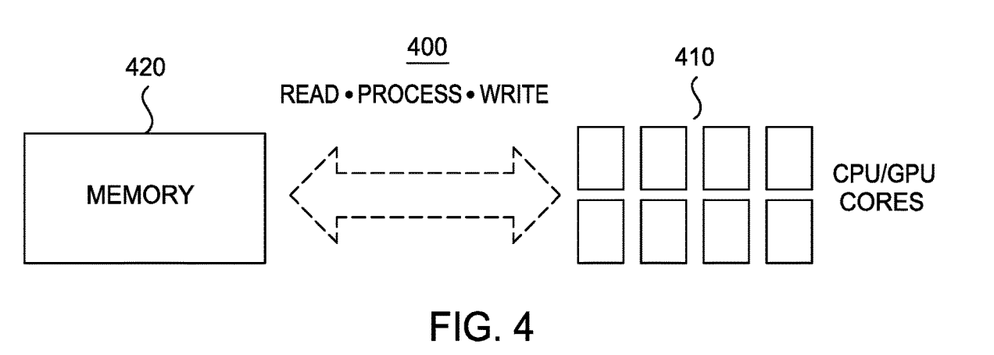
FIG. 4 depicts a simplified block diagram of a weight update methodology useful with at least one embodiment of the present disclosure.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation 400, where CPU/GPU cores 410 (i.e., simulated "neurons") read a memory (i.e., a simulated "synapse") and perform weight update processing operations, then write the updated weights back to memory 420. Accordingly, simplifying the crosspoint devices of ANN architectures to prioritize power-saving, offline learning techniques typically means that training speed and training efficiency are not optimized.

Figure 5:
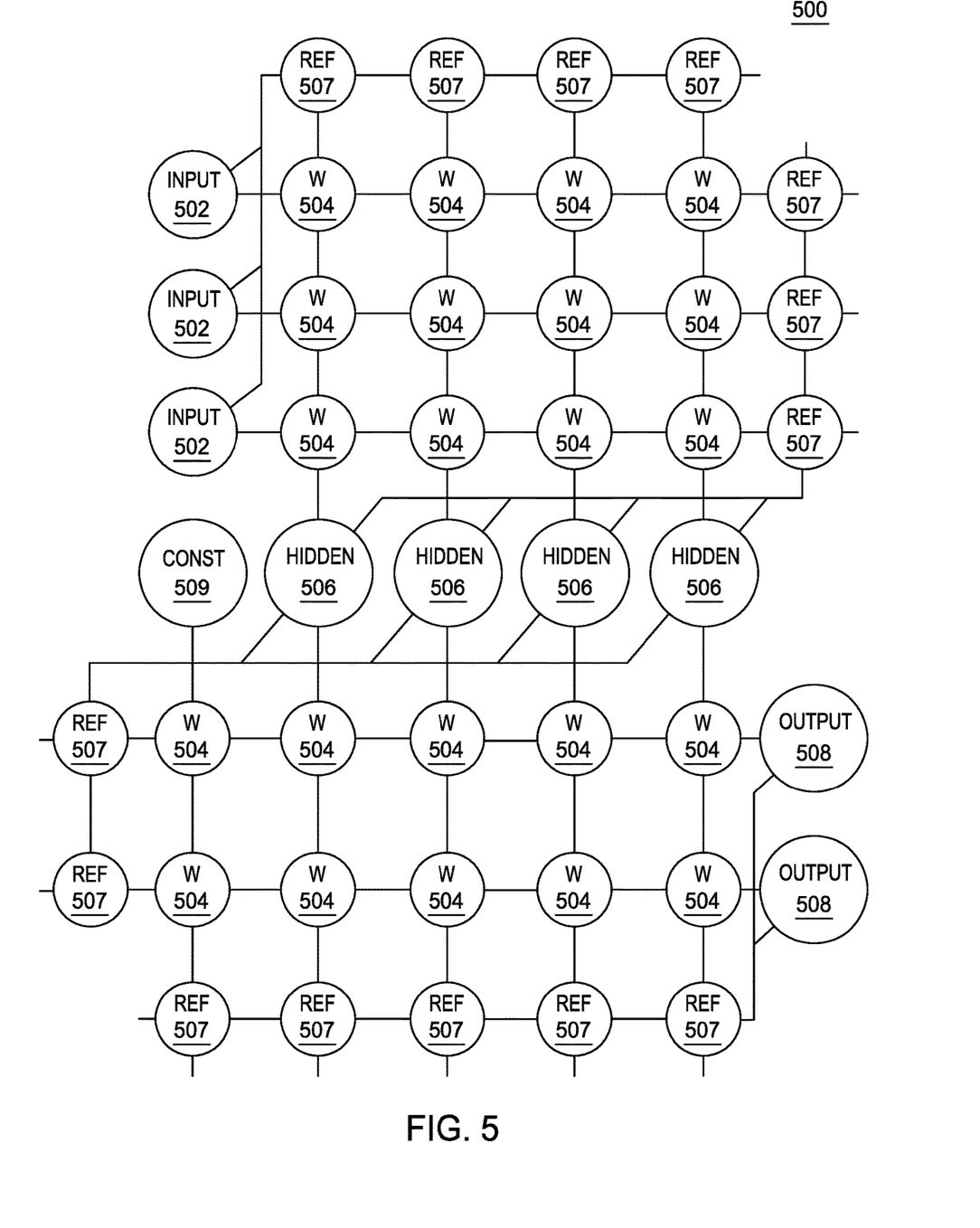
FIG. 5 is a diagram of an ANN including arrays of weights useful with at least one embodiment of the present disclosure.

FIG. 5 illustrates artificial neural network (ANN) architecture 500. During feed-forward operation, a set of input neurons 502 each provide an input voltage in parallel to a respective row of weights 504. A weight 504 can be any nonvolatile memory such as EEPROM, ReRAM, PCM, or the like. The weights 504 each have a settable resistance value, such that a current output flows from the weight 504 to a respective hidden neuron 506 to represent the weighted input. The current output by a given weight is determined as follows:

$$I=V*r \qquad \text{(Equation 1)}$$

Where V is the input voltage from the input neuron 502 and r is the set resistance of the weight 504. The current from each weight adds column-wise and flows to a hidden neuron 506. A set of reference weights 507 have a fixed resistance and combine their outputs into a reference current that is provided to each of the hidden neurons 506. Because conductance values can only be positive numbers, some reference conductance is needed to encode both positive and negative values in the matrix. The currents produced by the weights 504 are continuously valued and positive, and therefore the reference weights 507 are used to provide a reference current, above which currents are considered to have positive values and below which currents are considered to have negative values.

As an alternative to using the reference weights 507, another embodiment can use separate arrays of weights 504 to capture negative values. Each approach has advantages and disadvantages. Using the reference weights 507 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 504 of both positive and negative arrays are updated, but this also increases signal-to-noise ratio as each weight value is a difference of two conductance values.

The hidden neurons 506 use the currents from the array of weights 504 and the reference weights 507 to perform some calculation. The hidden neurons 506 then output a voltage of their own to another array of weights 507. This array performs in the same way, with a column of weights 504 receiving a voltage from their respective hidden neuron 506 to produce a weighted current output that adds row-wise and is provided to the output neuron 508.

It should be understood that any number of these stages can be implemented, by interposing additional layers of arrays and hidden neurons 506. It should also be noted that some neurons can be constant neurons 509, which provide a constant voltage to the array. The constant neurons 509 can be present among the input neurons 502 and/or hidden neurons 506 and are only used during feed-forward operation.

During back propagation, the output neurons 508 provide a voltage back across the array of weights 504. The output layer compares the generated network response to training data and computes an error. The error is applied to the array as a voltage pulse, where the height and/or duration of the pulse are modulated proportional to the error value. In this example, a row of weights 504 receives a voltage from a respective output neuron 508 in parallel and converts that voltage into a current which adds column-wise to provide an input to hidden neurons 506. The hidden neurons 506 provide combine the weighted feedback signal with a derivative of its feed-forward calculation and stores an error value before outputting a feedback signal voltage to its respective column of weights 504. This back propagation travels through the entire network 500 until all hidden neurons 506 and the input neurons 502 have stored an error value.

During weight updates, the input neurons 502 and hidden neurons 506 apply a first weight update voltage forward and the output neurons 508 and hidden neurons 506 apply a second weight update voltage backward through the network 500. The combinations of these voltages create a state change within each weight 504, causing the weight 504 to take on a new resistance value. In this manner, the weights 504 can be trained to adapt the neural network 500 to errors in its processing. It should be noted that the three modes of operation, feed forward, back propagation, and weight update, do not overlap with one another.

As previously noted herein, in order to limit power consumption, the crosspoint devices of ANN chip architectures are often designed to utilize offline learning techniques, where the approximation of the target function does not change once the initial training phase has been resolved. Offline learning allows the crosspoint devices of crossbar-type ANN architectures to be simplified such that they draw very little power.

As can be seen from the above discussion, effective neural network techniques require proper computation of negative and positive weights. Whichever technique is selected from above for computing the negative weight case, compromises between effectiveness and area have to be made. For example, one traditional technique uses a duplicate array with reference resistors, but this technique suffers a severe draw back in terms of area and energy consumption. An alternative approach uses a current mirror in connection with one or more points in an array column, but this also is associated with an area penalty, and also introduces noise and variability to a neural network system. One or more embodiments of the present disclosure attempt to cure these deficiencies by introducing a system and techniques for using the same that conserves area, while maintain circuit integrity an accuracy, while computing negative weights. In one or more embodiments, this is achieved by using a variable resistor and integrator in the neural network system.

Figure 6:
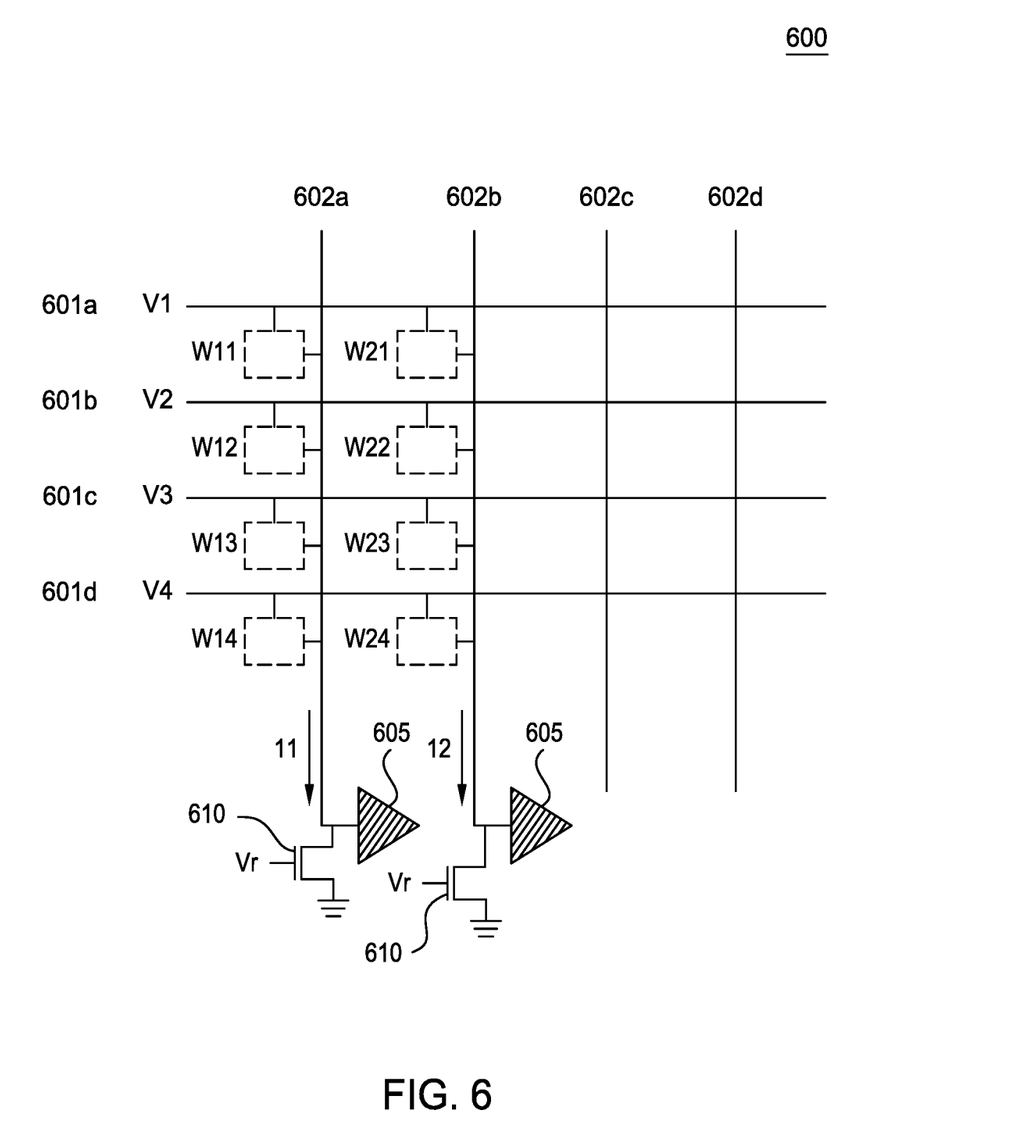
FIG. 6 illustrates a crosspoint array and system for a neurological network in accordance with at least one embodiment of the present disclosure.

FIG. 6 illustrates neural network circuit architecture according to an embodiment of the present disclosure. The system includes one or more reference rows 601a-601d with a voltage source attached thereto and producing a voltage at each row, e.g. V1-V4, thus forming one or more conductive rows. The rows form one or more crosspoints with one or more with one or more columns 602a-602d, where one or more crosspoints in the architecture 600 is associated with an individual weight w11, w12, w13, w14, w21, w22, etc. The individual weights can be established and initialized using any storage/circuit element and technique as described herein or otherwise suitable for setting a weight in a neural network, and the weights are for training a neural network as discussed herein. The system 600 includes one or more integrators 605 and one or more field-effect transistor ("FET") devices 610 connected to one or more integrators 605, where in one embodiment the FETs 610 are variable resistor devices. In one embodiment, the one or more integrators 605 and FETs 610 (e.g., variable resistors) are connected to one another at the terminal end of each column 602a, 602b, etc. Each FET 610 is associated with a particular reference current that can be dependent on input voltages, e.g. V1-V4, device parameters associated with either or both the integrator 605 and the FET 610 and/or known weights in the system. In one of the present disclosure, the FET 610 subtracts and/or adjusts current entering the integrator 605 to provide for a proper reference voltage for computing negative weights. Once a proper reference voltage is pre-selected (or determined as discussed herein), the combination of the integrator 605 and the FET 610 can begin to tune/train the neural network system 600. In one embodiment, the voltage applied to the variable resistor can be a stochastic time signal or a constant analog signal.

Figure 7:
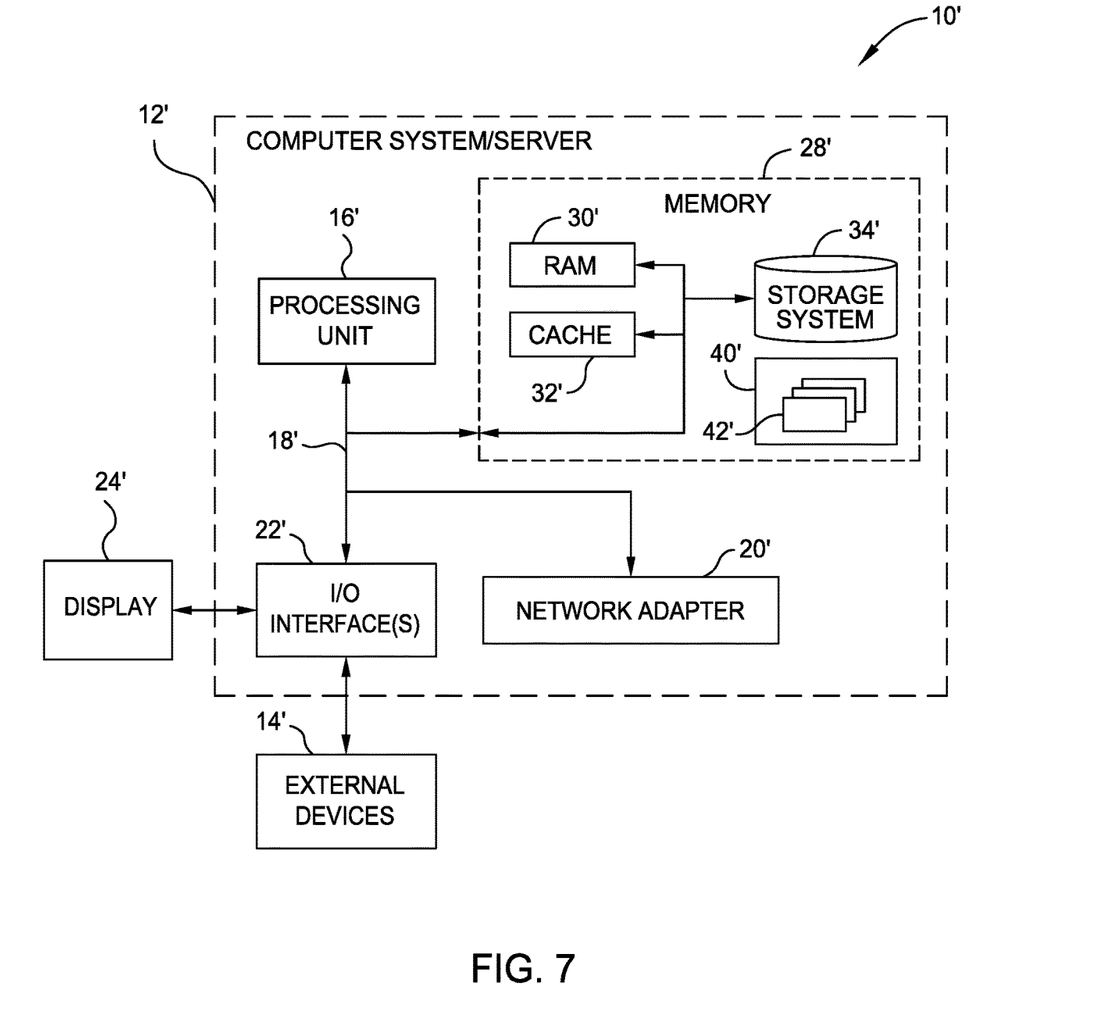
FIG. 7 illustrates a computing device for executing one or more flows of at least one embodiment of the present disclosure.

FIG. 7 illustrates a computer system/server 12 capable for executing the flows of FIGS. 8A, 8B, and 8C (discussed below) is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the disclosure.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, and external disk drive arrays, RAID systems, tape drives, and data archival storage systems, etc.

Figure 8A:
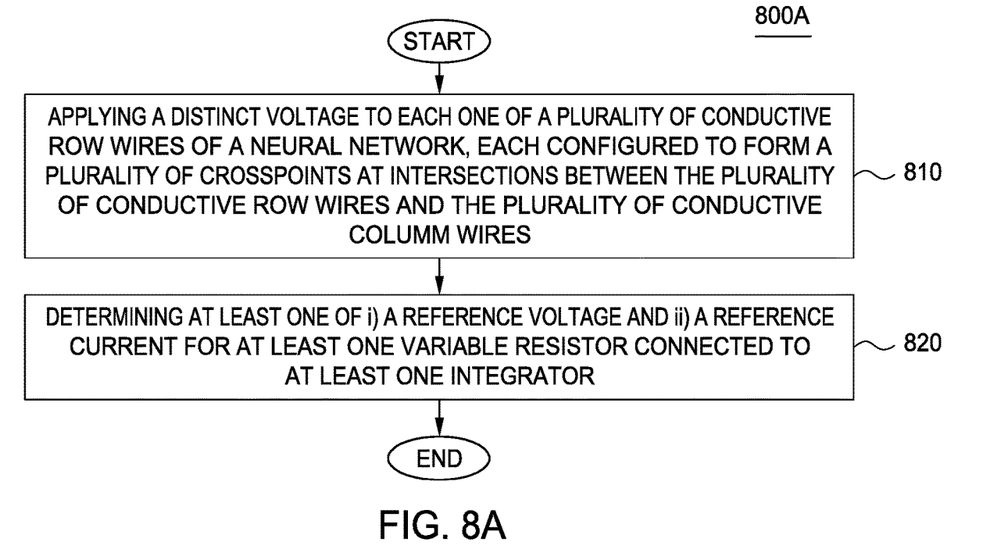
FIG. 8A illustrates a flow for using the crosspoint array and system of FIG. 6 in according to an embodiment of the present disclosure.
Figure 8B:
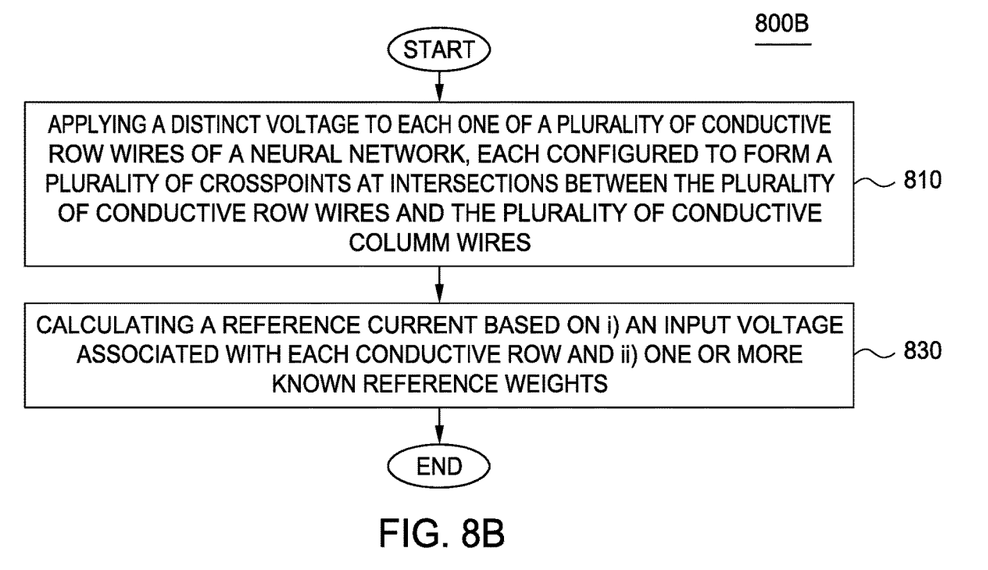
FIG. 8B illustrates a flow for using the crosspoint array and system of FIG. 6 in according to an embodiment of the present disclosure.
Figure 8C:
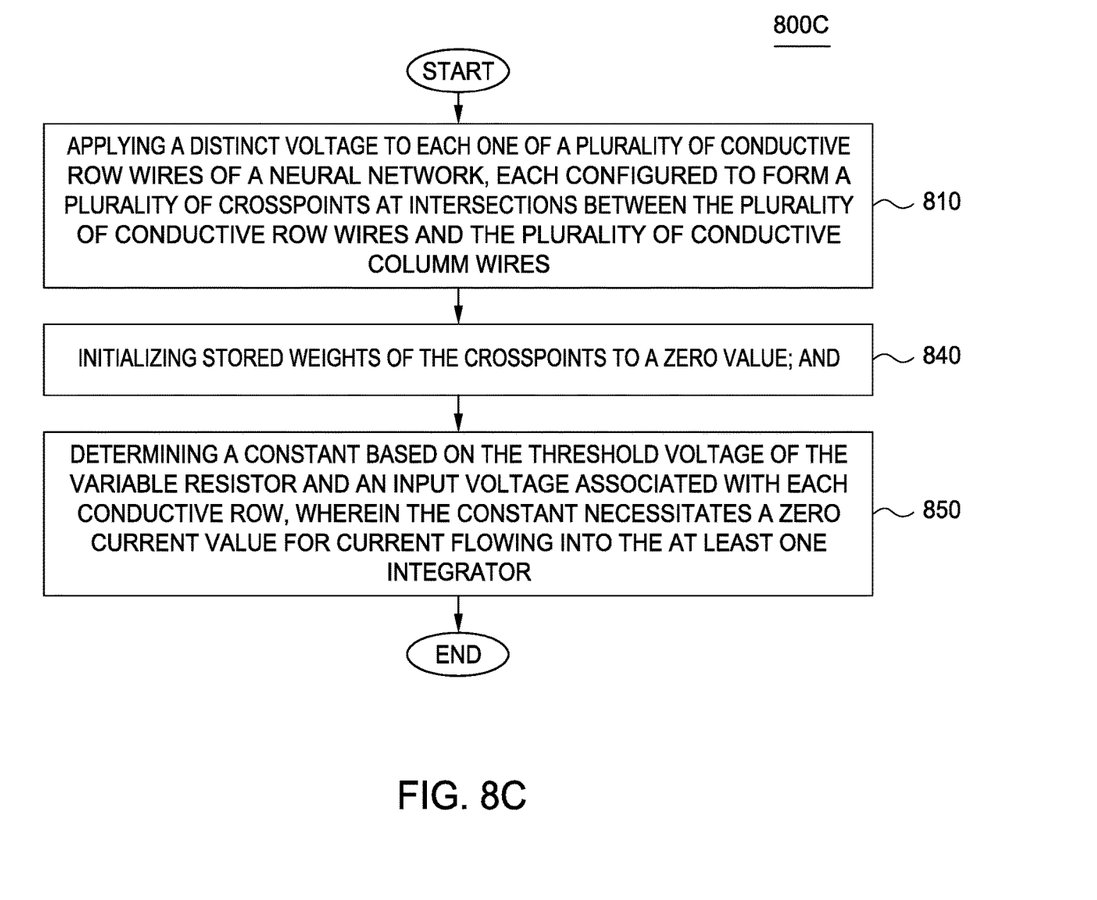
FIG. 8C illustrates a flow for using the crosspoint array and system of FIG. 6 in according to an embodiment of the present disclosure.
Figure 8D:
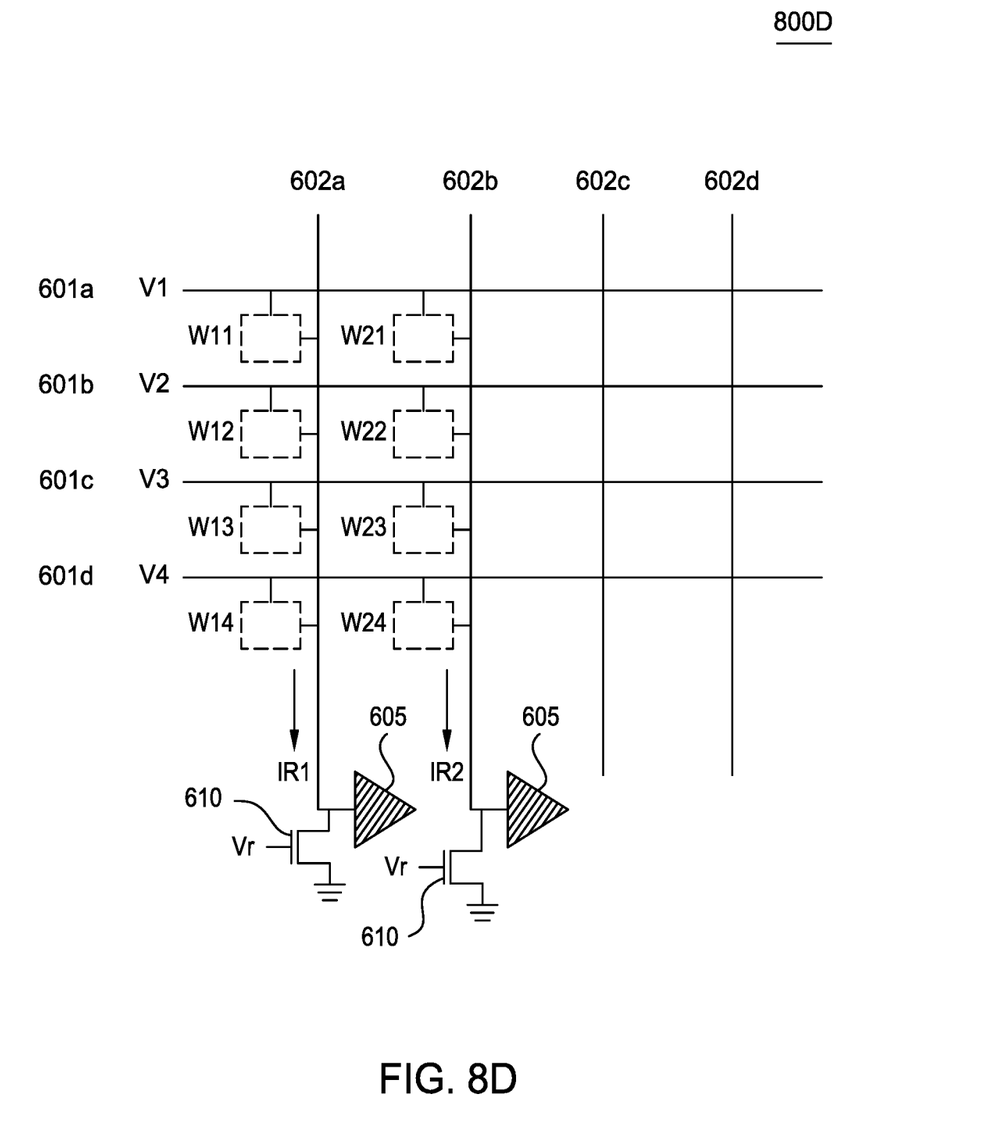
FIG. 8D illustrates the system of FIG. 6 according to an embodiment where the flow of FIG. 8B is applied thereto.

FIG. 8A, FIG. 8B, and FIG. 8C each illustrate one or more a flows for using the system in FIG. 6 in accordance with at least one embodiment of the present disclosure. FIG. 8D shows the system 600 as used in accordance with FIG. 8B. One or more blocks of the flow can be carried out manually by a user, one or more of the blocks can be carried out by one or more computer devices as provide for herein, or any combination thereof. In one embodiment, one or more blocks, e.g. 810, 820, 830, 840, 850, etc. are stored in memory 28' as the program modules 42', and are executed by the processor 16' to use and/or set the system of FIG. 6 in one or more ways as described herein.

FIG. 8 illustrates a flow 800A for using one or more system parameters of system 600 in accordance with at least one embodiment of the present disclosure. At 810, a computer system, as shown in FIG. 7, provides for the application of a distinct voltage, e.g. V1-V4, to each one of a plurality of conductive row wires, e.g. 601a-601d, of a neural network, where a plurality of conductive column wires, e.g. 602a-602d, form a plurality of crosspoints at intersections between the plurality of conductive row wires and the plurality of conductive column wires. At 820, the computer system determines at least one of i) a reference voltage and ii) a reference current for at least one variable resistor 610 connected to at least one integrator 605 where the at least one variable resistor 610 and the at least one integrator 605 are connected at the end of at least one of the plurality of conductive column wires.

FIG. 8B is a flow 800B for determining a reference voltage according to an embodiment of the present disclosure. The flow begins at 810 which is the same as in the flow 800A, and thus, is not repeated here. At 830, the computer system calculates a reference current based on i) an input voltage associated with each conductive row, e.g., V1-V4, and ii) one or more known reference weights. In one embodiment, the reference weights are shown in FIG. 8D, e.g. wr11, wr12, wr13, wr14, wr21, etc., and the reference current (governed by the equation below) flowing into flowing into each integrator 605 is shown as $IR_1$ and $IR_2$, for each column respectively. The reference current is governed by the equation:

$$Ir = V1*wr + \ldots + Vn*wr \quad \text{(Equation 2)}$$

In this embodiment, the weights, as shown in FIG. 8B, of the neural network 600 are known references weights wr11, wr12 . . . and each reference current $IR_1$ and $IR_2$ is a governed by the above equation. Although the reference weights are shown at the crosspoints, other configurations are possible. Once the reference current is computed, then an appropriate reference voltage can be computed for each column by the following equation:

$$Vr = Ir/(A+Vt) \quad \text{(Equation 2)}$$

The reference voltage for each variable resistor 605 is thus based on i) the threshold voltage of the particular device 605, ii) a physical constant associated with particular device 605, and iii) the reference current for the particular column, e.g. $IR_1$ and $IR_2$. The determined reference voltages $VR_1$ and $VR_2$ can then be used to tune or teach the neural network for the negative weight scenarios associated with the system 600. In one embodiment, $VR_1$ and $VR_2$ can produce a reference current below which currents generated from one or more weights, e.g. wr11, will be negative, and for training the neural network system accordingly.

FIG. 8C a flow 800C for determining a reference voltage according to an embodiment of the present disclosure is shown. The flow begins at 810 which is described above. In block 840, the system 600 is initialized so that all relevant reference weights with respect to a column, e.g. w11, w12, w13, w14, w21, w22, etc. are set to zero. In block 840, a constant that will produce a zero current entering one or more integrators 610 and a reference voltage will be determined based on the initialization, where the reference voltage for each variable resistor 605 (e.g., each column) can then be determined with the following equation:

$$Vr = K(V1+V2+V3+V4) - Vt \quad \text{(Equation 3)}$$

The constant "K" is determined by determining for what value of "K" a zero current is enters the integrators 605 of the relevant column, where Vt, as above, is the threshold voltage for the particular variable resistor at issue. Once the constant and associated reference voltage is determined, it can be reused past initialization for negative weight computations, e.g. it will produce a reference current below which currents generated from one or more weights, e.g. w11, will be negative, and for training the neural network system accordingly.
currents produced by the weights in a neural network are continuously valued and positive, and therefore reference weights are used to provide a reference current, above which currents are considered to have positive values and below which currents are considered to have negative values, and as such, the accuracy of the comparison is important to the integrity of the network In one or more embodiments, computing and assessing negative weights is achieved by using a variable resistor and integrator in the neural network system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
applying a voltage to each one of a plurality of conductive rows of a neural network, wherein the plurality of conductive rows intersect a plurality of conductive columns to form a plurality of crosspoints, and wherein a circuit element at each of the plurality of crosspoints is configured to store a weight of the neural network; and
determining at least one of a reference voltage or a reference current for each of a plurality of variable resistors by:
initializing each of the stored weights to a zero value; and
determining a constant based on a threshold voltage of each of the plurality of variable resistors and an input voltage associated with each conductive row, wherein each of the plurality of variable resistors and each of a plurality of integrators are connected to a respective end of one of the plurality of conductive columns, and wherein the constant necessitates a zero current value for current flowing into each of the plurality of integrators.

2. The method of claim 1, wherein a first end of a variable resistor of the plurality of variable resistors is connected to a same node on an end of at least one of the plurality of conductive columns as an input of an integrator of the plurality of integrators.

3. The method of claim 2, wherein determining at least one of the reference voltage and the reference current for each of the plurality of variable resistors further comprises:

calculating a reference current based on i) an input voltage associated with each conductive row and ii) one or more known reference weights.

4. The method of claim 3, further comprising:
calculating the reference voltage based on the reference current.

5. A computer program product for determining a parameter of a neural network circuit, the computer program product comprising:
a computer-readable storage medium having computer-readable program code embodied therewith, the computer-readable program code executable by one or more computer processors to:
apply a voltage to each one of a plurality of conductive rows of a neural network, wherein the plurality of conductive rows intersect a plurality of conductive columns to form a plurality of crosspoints, and wherein a circuit element at each of the plurality of crosspoints is configured to store a weight of the neural network; and
determine at least one of a reference voltage or a reference current for each of a plurality of variable resistors by:
initializing each of the stored weights to a zero value; and
determining a constant based on a threshold voltage of each of the plurality of variable resistors and an input voltage associated with each conductive row, wherein each of the plurality of variable resistors and each of a plurality of integrators are connected to a respective end of one of the plurality of conductive columns, and wherein the constant necessitates a zero current value for current flowing into each of the plurality of integrators.

6. The computer program product of claim 5, wherein a first end of a variable resistor of the plurality of variable resistors is connected to a same node on an end of at least one of the plurality of conductive columns as an input of an integrator of the plurality of integrators.

7. The computer program product of claim 5, wherein the computer-readable program code is further executable to determine at least one of the reference voltage and the reference current for each of the plurality of variable resistors by:
calculating a reference current based on i) an input voltage associated with each conductive row and ii) one or more known reference weights.

8. The computer program product of claim 5, wherein the computer-readable program code is further executable to calculate the reference voltage based on the reference current.

9. A crosspoint array for implementing a neural network, the crosspoint array comprising:
a set of conductive rows;
a set of conductive columns intersecting the set of conductive rows to form a plurality of crosspoints;
a circuit element coupled to each of the plurality of crosspoints configured to store a weight of the neural network;
a voltage source associated with each conductive row;
a first integrator attached at an end of a first conductive column of the set of conductive columns;
a first variable resistor attached to the first integrator and the end of the first conductive column;
a second integrator attached at an end of a second conductive column of the set of conductive columns; and
a second variable resistor attached to the second integrator, wherein each of the first and second conductive columns has one or more distinct current flows based on one or more reference weights, each one of the one or more distinct current flows being unique to each of the first and second conductive columns, wherein a first of the one or more distinct current flows is associated with the first integrator and a second one of the one or more distinct current flows is associated with the second integrator, wherein all weights of the neural network are configured to an initial zero value, and wherein a reference voltage is configured by determining a constant value to be applied to a threshold voltage of the first integrator when i) the weights are configured to the initial zero value and ii) a voltage source of each conductive row is active.

10. The crosspoint array of claim 9, wherein the first variable resistor is configured to subtract current entering the first integrator from the first conductive column.

11. The crosspoint array of claim 9, wherein the first variable resistor is connected to ground.

12. The crosspoint array of claim 9, wherein the first integrator and the first variable resistor are configured to process a negative weight associated with the first conductive column.

13. The crosspoint array according to claim 9, wherein a reference voltage is applied to the first variable resistor.

14. The crosspoint array according to claim 12, wherein the reference voltage is one of i) a continuous analog signal and ii) a time domain stochastic signal.

15. The crosspoint array according to claim 9, wherein the first variable resistor and the first integrator are configured such that the first variable resistor produces a reference current based in part on one or more pre-set reference weights.

* * * * *